US012725945B2

(12) United States Patent
Wu

(10) Patent No.: US 12,725,945 B2
(45) Date of Patent: Sep. 1, 2026

(54) TERMINAL BLOCK WITH HANDLE

(71) Applicants: DINKLE ENTERPRISE CO., LTD., New Taipei City (TW); DINKLE ELECTRIC MACHINERY (CHINA) CO., LTD., Kunshan (CN); LI YANG ELECTRIC MACHINERY (DONGGUAN) CO., LTD., Dong Guan City (CN)

(72) Inventor: Shang-Tsai Wu, New Taipei City (TW)

(73) Assignees: DINKLE ENTERPRISE CO., LTD., New Taipei City (TW); DINKLE ELECTRIC MACHINERY (CHINA) CO., LTD., Kunshan (CN); LI YANG ELECTRIC MACHINERY (DONGGUAN) CO., LTD., Dong Guan City (CN)

( * ) Notice: Subject to any disclaimer, the term of this patent is extended or adjusted under 35 U.S.C. 154(b) by 344 days.

(21) Appl. No.: 18/659,110

(22) Filed: May 9, 2024

(65) Prior Publication Data

US 2025/0350045 A1 Nov. 13, 2025

(51) Int. Cl.
*H01R 9/24* (2006.01)
*H01R 4/48* (2006.01)

(52) U.S. Cl.
CPC ....... *H01R 9/2416* (2013.01); *H01R 4/48365* (2023.08)

(58) Field of Classification Search
CPC .......................... H01R 9/2416; H01R 4/48365
See application file for complete search history.

(56) References Cited

U.S. PATENT DOCUMENTS

2011/0156853 A1* 6/2011 Kato .................... H01F 27/327 336/221

FOREIGN PATENT DOCUMENTS

| | | |
|---|---|---|
| CN | 209963279 U | 1/2020 |
| CN | 110838643 A | 2/2020 |
| CN | 115207653 A | 10/2022 |

(Continued)

OTHER PUBLICATIONS

Office Action dated Jan. 21, 2025 of the corresponding German patent application No. 102024115587.6.

*Primary Examiner* — Neil Abrams
(74) *Attorney, Agent, or Firm* — HDLS IPR SERVICES; Chun-Ming Shih

(57) ABSTRACT

A terminal block includes a base having an accommodation space, an installation opening, an insertion port and a penetration port. A pivot portion is formed adjacent to the installation opening. An elastic piece includes a bending section, a movable elastic arm, and a resisting arm. The movable elastic arm and the resisting arm extend respectively from two sides of the bending section, and the bending section surrounds the pivot portion. A conductive terminal includes a conductive section and a conducting lead. The conductive section contacts the resisting arm, and the conducting lead is disposed corresponding to the penetration port. A handle is combined in the installation opening, pivotally connected to the pivot portion, and exposed from one side of the insertion port. A cable is inserted into the accommodation space through the insertion port to be electrically connected with the at least one conducting lead.

20 Claims, 12 Drawing Sheets

(56) References Cited

FOREIGN PATENT DOCUMENTS

| | | | |
|---|---|---|---|
| CN | 117458175 | A | 1/2024 |
| DE | 202013101582 | U1 | 8/2014 |
| DE | 202015102045 | U1 | 9/2016 |
| DE | 102021128055 | A1 | 5/2023 |

* cited by examiner

TERMINAL BLOCK WITH HANDLE

BACKGROUND OF THE DISCLOSURE

Technical Field

The technical field relates to a terminal block, and more particularly, to a terminal block with a handle structure.

Description of Related Art

A terminal block is an electrical conducting device including components such as an insulating seat, spring clips, and conductive terminals, and that provides a platform for the electrical connection of multiple cables. Specifically, the spring clips and conductive terminals are mounted within the insulating seat. Moreover, the spring clips may be pressed using a screwdriver or other external tools to facilitate the insertion of external cables into the insulating seat to contact with the conductive terminals and achieve wiring connections.

Furthermore, when pressing the spring clips, the screwdriver is pushed straight against the handle, driving it to press the spring clips. However, the screwdriver necessitates a long stroke at one end of the handle to achieve the required moving distance for pressing against the spring clips. This not only causes inconvenience during operation but also increases the overall size of the terminal block.

In view of the above drawbacks, the inventor proposes this disclosure based on his expert knowledge and elaborate researches in order to solve the problems of related art.

SUMMARY OF THE DISCLOSURE

This disclosure provides a terminal block having a handle, in which the handle pushes the elastic pieces for the required movement distance with a shorter stroke, thus enhancing the convenience of operation and reducing the overall size of the terminal block.

This disclosure is a terminal block for inserting a cable. The terminal block includes a base, an elastic piece, a conductive terminal and a handle. The base includes an accommodation space, an installation opening, an insertion port, and a penetration port all communicating with the accommodation space, and includes a pivot portion disposed in the accommodation space and adjacent to the installation opening. The elastic piece includes a bending section, a movable elastic arm, and a resisting arm. The movable elastic arm and the resisting arm extend respectively from two sides of the bending section, and the bending section surrounds the pivot portion. The conductive terminal includes a conductive section and at least one conducting lead extending from the conductive section. One end of the conductive section contacts the resisting arm, and the at least one conducting lead is disposed corresponding to the penetration port. The handle is combined in the installation opening, pivotally connected to the pivot portion, and exposed from one side of the insertion port. The handle rotates and pushes the movable elastic arm under an external force. The movable elastic arm is being pushed and abuts against the resisting arm, and the cable is inserted into the accommodation space through the insertion port to be electrically connected with the at least one conducting lead.

In one embodiment of this disclosure, the insertion port and the installation opening are defined on the same side of the base and located on the side perpendicular to the penetration port.

In one embodiment of this disclosure, the pivot portion includes a coaxially arranged cylinder column and a pivot shaft, and the pivot shaft protrudes from the cylinder column.

In one embodiment of this disclosure, the bending section forms a pivot space, and the bending section encircles the cylinder column with the pivot space.

In one embodiment of this disclosure, the base includes a plurality of positioning parts within the accommodating space, and the resisting arm abuts against one side of the positioning parts and is arranged in the accommodating space.

In one embodiment of this disclosure, the positioning parts includes a positioning plate and a positioning block, one side of the positioning plate is connected to the cylinder column, and the positioning block is spaced apart on one side of the positioning plate.

In one embodiment of this disclosure, the resisting arm includes a hook on a side facing the movable elastic arm, and the movable elastic arm is pressed and engages with the hook.

In one embodiment of this disclosure, the conductive terminal further includes a supporting plate disposed between the conductive section and the at least one conducting lead, and the amount of the at least one conducting lead is one pair, and the pair of conducting leads are arranged on two sides of the supporting plate opposite to each other.

In one embodiment of this disclosure, the conductive section includes a U-shaped frame.

In one embodiment of this disclosure, the handle includes a body, an actuating part and a pressing part, the actuating part is exposed from the installation opening, the pressing part is positioned adjacent to the movable elastic arm, and the actuating part and the pressing part are located on two sides of the body opposite to each other.

In one embodiment of this disclosure, an axis hole is defined on the body, and the handle is combined with the base through the pivot portion passing through the axis hole.

In one embodiment of this disclosure, the body includes a protrusion column on a side facing the accommodating space, and the handle is held at a specific angle through the protrusion column pushed by the movable elastic arm.

In one embodiment of this disclosure, the actuating part includes an insertion hole.

In one embodiment of this disclosure, the actuating part includes a pressing plate.

In one embodiment of this disclosure, the terminal block further includes a side cover combined with one side of the base and enclosing the accommodation space.

In one embodiment of this disclosure, the amount of the base is plural, a plurality of bases is arranged side by side, with the outermost base being combined with a side cover; and an amount of the elastic piece, the conductive terminal and handle is correspondingly arranged to plural and combined on the bases.

In comparison with the related art, the base of the terminal block with a handle includes an installation opening, and the base is formed with a pivot portion at the position adjacent to the installation opening, whereby the actuating part of the handle is adjacent to the pivot portion. Additionally, since the distance between the actuating part and the pivot portion is shorter than the distance between the movable elastic arm and the pivot portion; thus, when being subjected to external force, the actuating part only requires a shorter travel distance for a larger displacement of the movable elastic arm, thereby facilitating the operation and achieving the purpose of reducing the overall size of the terminal block.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

FIG. 6 illustrates a cross-sectional view of the terminal block when a cable is inserted in.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
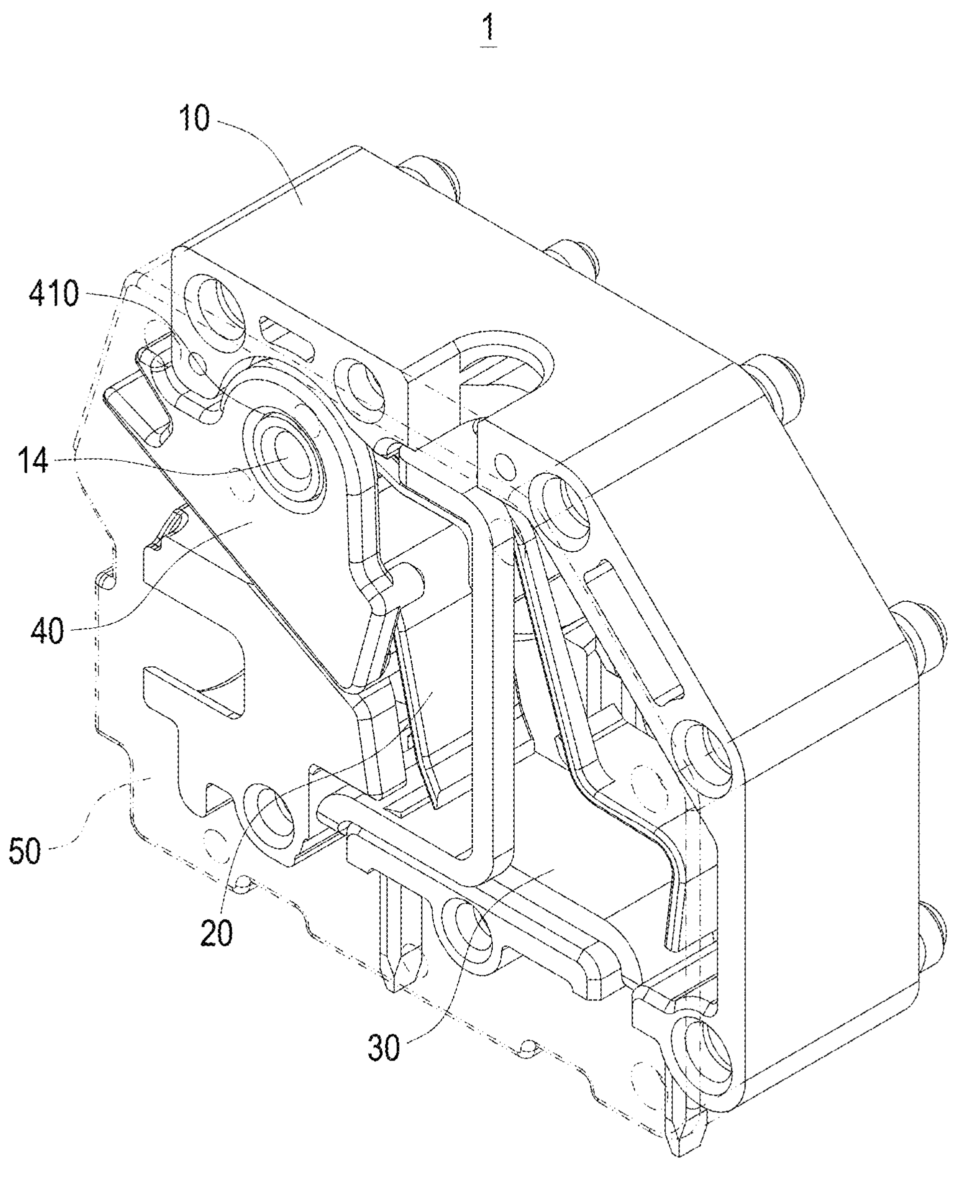
FIG. 1 illustrates a perspective schematic view of the terminal block with a handle in this disclosure.

Please refer to FIG. 1 to FIG. 4, which depict a perspective schematic view of the terminal block with a handle in this disclosure, a perspective exploded schematic view of the terminal block with a handle in this disclosure, a perspective schematic view of the handle in this disclosure and a cross-sectional schematic view of the terminal block with a handle in this disclosure. As shown in FIG. 1, this disclosure describes a terminal block 1 including a base 10, an elastic piece 20, a conductive terminal 30, a handle 40 and a side cover 50. The elastic piece 20 and the conductive terminal 30 are connected to each other and combined in the base 10. The handle 40 and the side cover 50 are attached to one side of the base 10.

Figure 2:
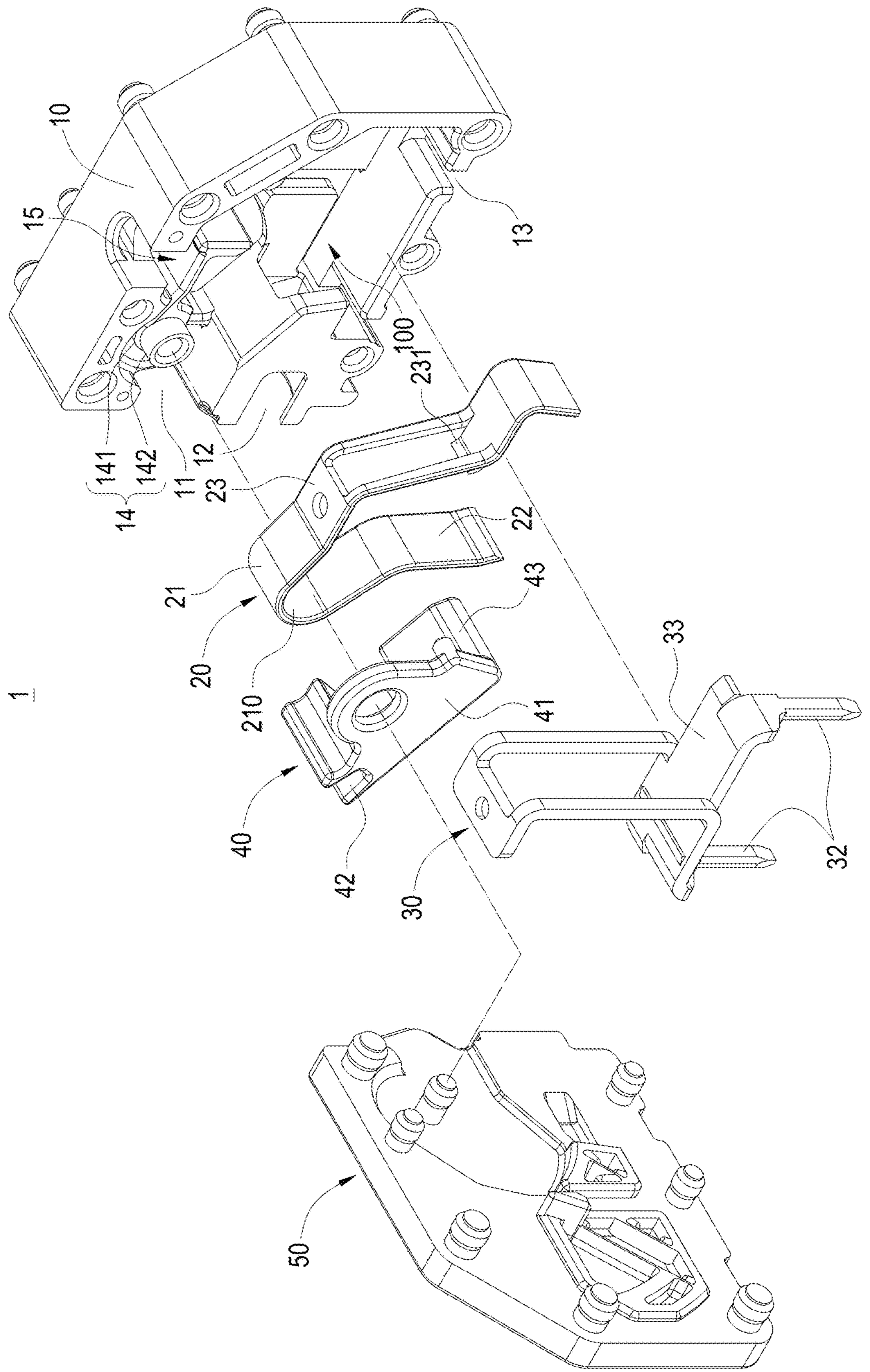
FIG. 2 illustrates a perspective exploded schematic view of the terminal block with a handle in this disclosure.

As shown in FIG. 2, the base 10 has an accommodation space 100. An installation opening 11, an insertion port 12, and a penetration port 13 are defined on the base 10 and communicate with the accommodation space 100. Additionally, the side cover 50 encloses the accommodation space 100. The base 10 includes a pivot portion 14 disposed in the accommodation space 100 and adjacent to the installation opening 11.

In this embodiment, the insertion port 12 and the installation opening 11 are defined on the same side of the base 10 and located on the side perpendicular to the penetration port 13. Furthermore, the pivot portion 14 includes a cylinder column 141 and a pivot shaft 142 coaxially arranged with each other, and the pivot shaft 142 protrudes from the cylindrical column 141.

The elastic piece 20 includes a bending section 21, a movable elastic arm 22 and a resisting arm 23. The movable elastic arm 22 and the resisting arm 23 extend respectively from two sides of the bending section 21, and the bending section 21 is attached to (surrounds) the pivot portion 14 (refer to FIG. 4). Specifically, the bending section 21 forms a pivot space 210, and the bending section 21 encircles the cylinder column 141 with the pivot space 210.

It should be noted that the resisting arm 23 includes a hook 231 disposed on the side facing the movable elastic arm 22. The movable elastic arm 22 is pressed to be engaged with the hook 231 (see FIG. 4).

Moreover, the conductive terminal 30 includes a conductive section 31 and at least one conducting lead 32 extending from the conductive section 31. The conducting lead 32 is positioned corresponding to the penetration port 13. Moreover, the conductive section 31 includes a U-shaped frame, and one end of the conductive section 31 contacts the resisting arm 23 of the elastic piece 20. In this embodiment, the conducting lead 32 includes an insertion pin. The conducting leads 32 passes through the penetration port 13 of the base 10 (refer to FIG. 4) for being inserted into a circuit board (not shown in figures).

Moreover, the conductive terminal 30 further includes a supporting plate 33 disposed between the conductive section 31 and the conducting lead 32. In this embodiment, the amount of the conducting lead 32 is two (one pair). The pair of conducting leads 32 are arranged on two sides of the supporting plate 33 opposite to each other.

The handle 40 is combined in the installation opening 11 of the base 10. Additionally, the handle 40 is pivotally connected to the pivot portion 14 and exposed from one side of the insertion port 12.

Figure 3:
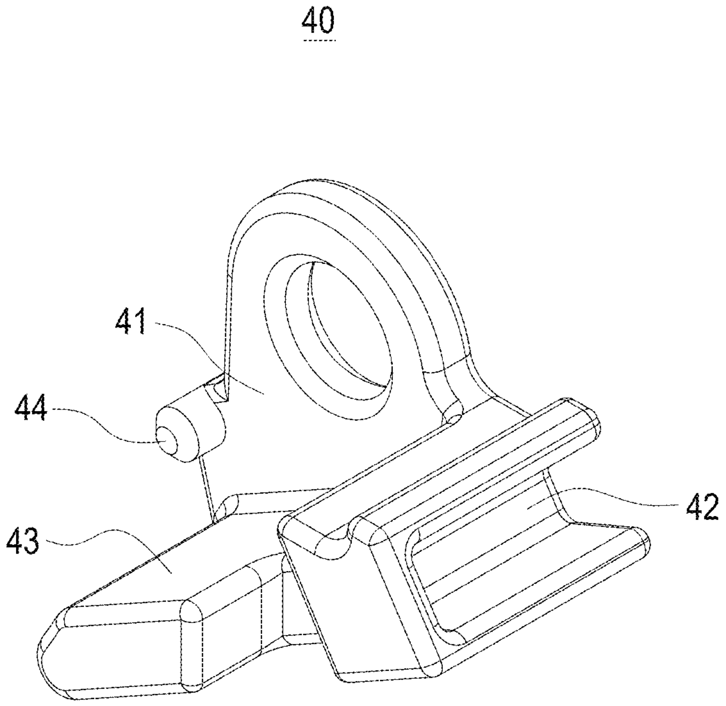
FIG. 3 is a perspective schematic view of the handle in this disclosure.

As shown in FIG. 3, the handle 40 includes a body 41, an actuating part 42 and a pressing part 43. The actuating part 42 is exposed from the installation opening 11. The actuating part 42 and the pressing part 43 are located on two sides of the body 41 opposite to each other. Specifically, an axis hole 410 is defined on the body 41. The handle 40 is attached to the base 10 via the pivot portion 14 passing through the axis hole 410 (refer to FIG. 1). Additionally, the actuating part 42 includes an insertion hole for inserting a tool 2, such as a screwdriver.

Figure 4:
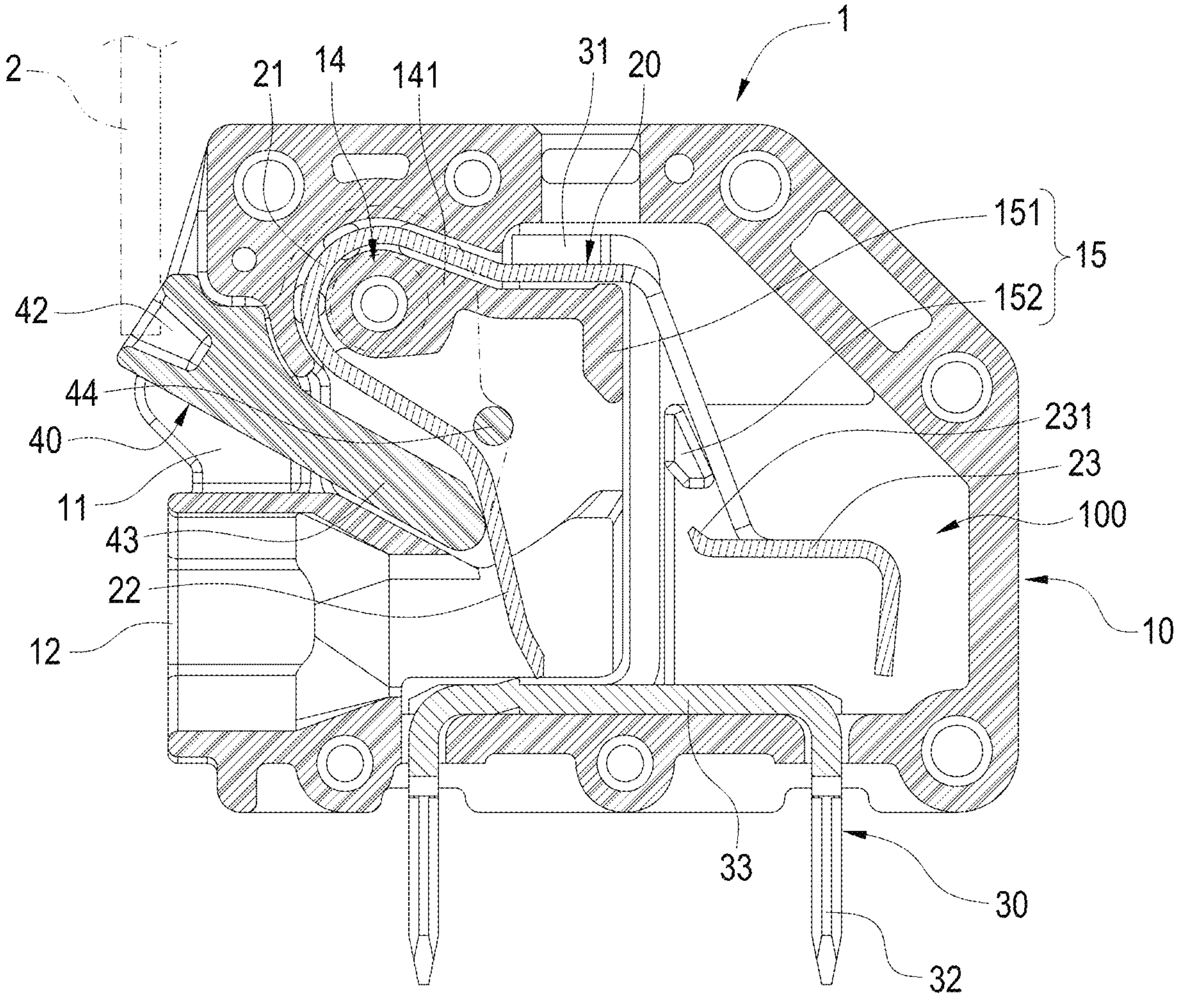
FIG. 4 illustrates a cross-sectional schematic view of the terminal block with a handle in this disclosure.

As shown in FIG. 4, in this embodiment, the base 10 includes a plurality of positioning parts 15 disposed in the accommodating space 100. Moreover, the resisting arm 23 abuts against one side of the positioning parts 15 and is arranged in the accommodating space 100.

In more detail, the positioning parts 15 includes a positioning plate 151 and a positioning block 152. One side of the positioning plate 151 is connected to the cylinder column 141 of the pivot portion 14. The positioning block 152 is spacedly disposed on one side of the positioning plate 151. Accordingly, the resisting arm 23 is positioned on the positioning plate 151 and the positioning block 152 and extends to the opposite side of the movable elastic arm 22.

It should be noted that the pressing part 43 is located adjacent to the movable elastic arm 22. Moreover, users may use a tool 2 to apply force to the actuating part 42. As a result, the handle 40 rotates under the action of external force to make the pressing portion 43 abut against the movable elastic arm 22.

Figure 5:
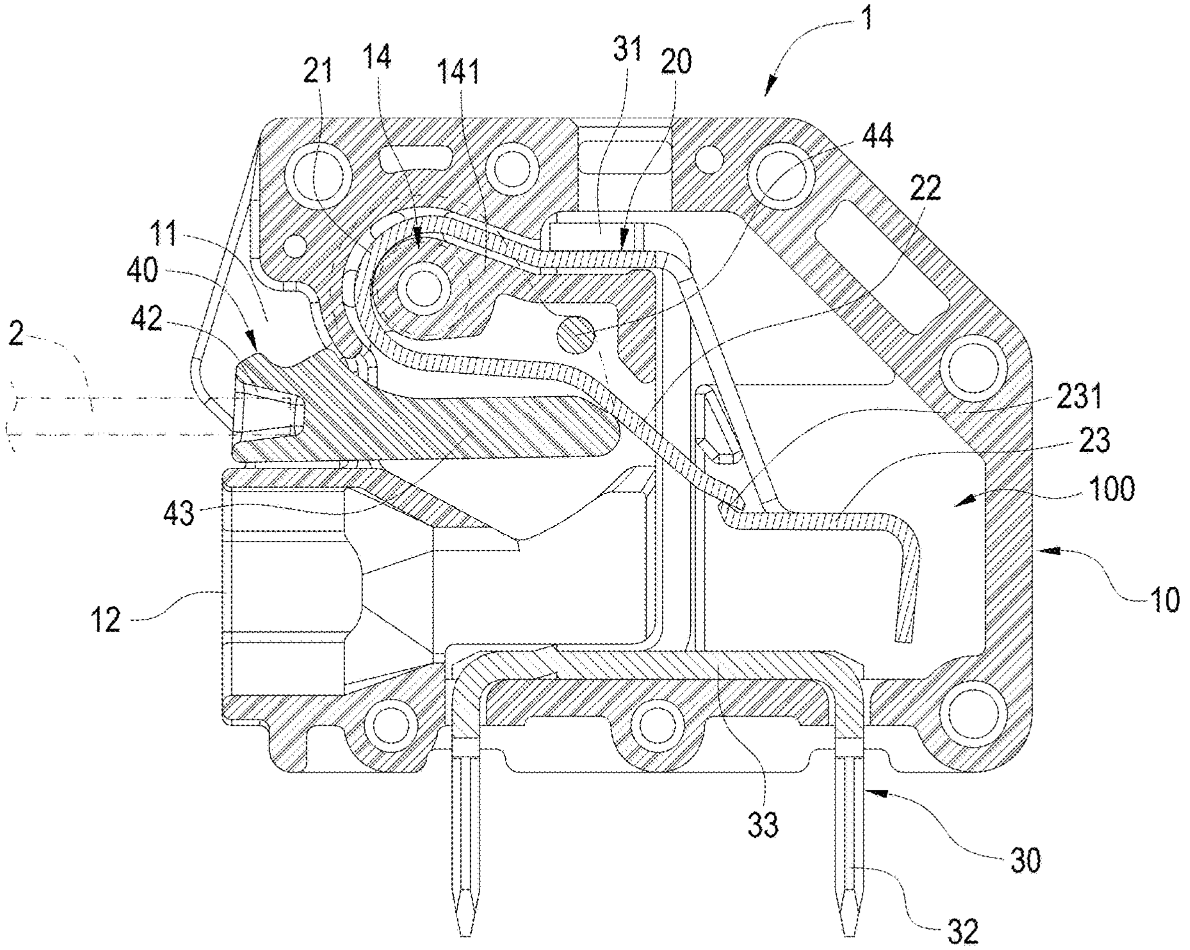
FIG. 5 illustrates a cross-sectional view of the handle under external force in this disclosure.
Figure 6:
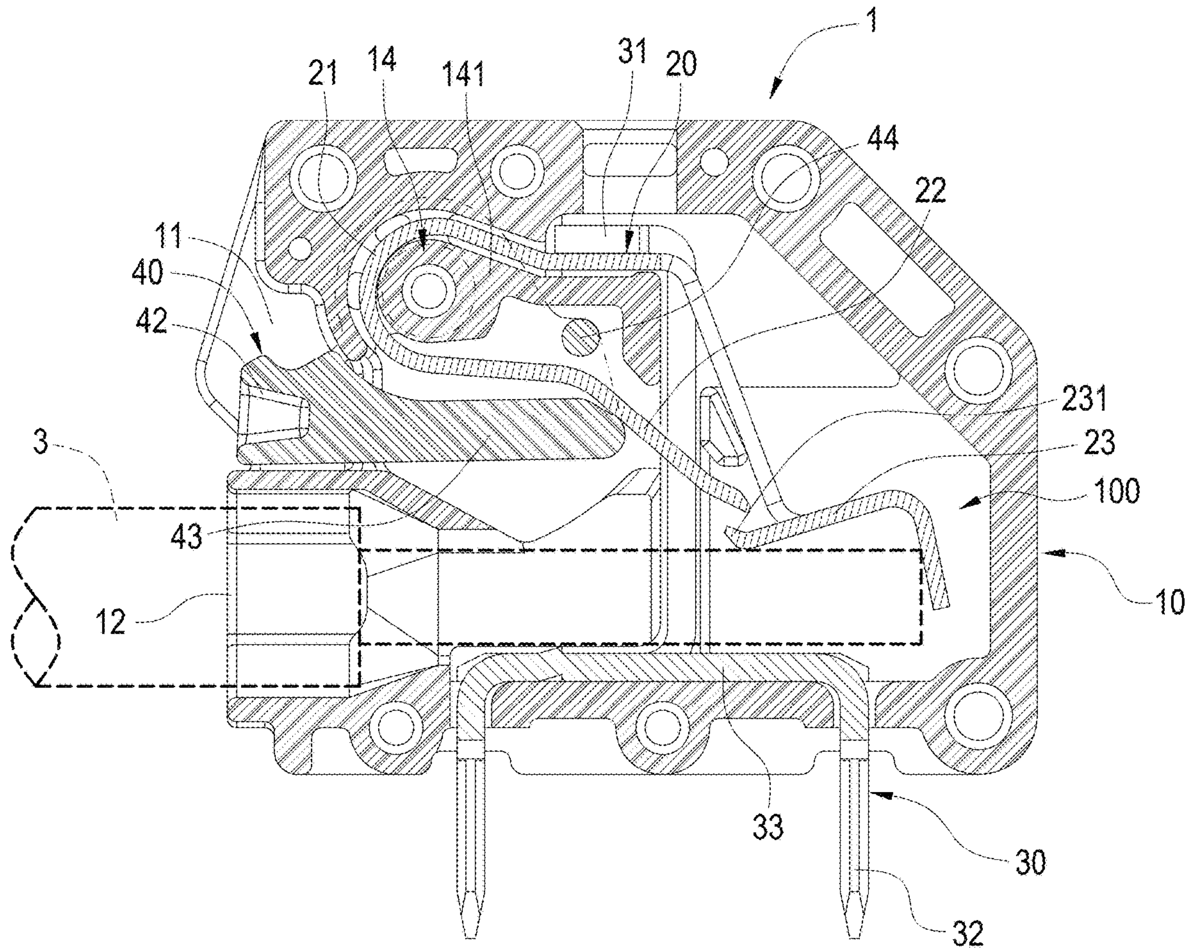

Please further refer to FIG. 5 and FIG. 6, which depict a cross-sectional view of the handle under an external force in this disclosure and a cross-sectional view of the terminal block in this disclosure when a cable is inserted in. The terminal block 1 is used for connecting a cable 3. When inserting the cable 3 into the terminal block 1, the user inserts a tool 2 into the actuating part 42 and applies force to rotate the handle 40 around the pivot portion 14. Furthermore, the pressing portion 43 of the handle 40 may push against the movable elastic arm 22 to make the end of the movable elastic arm 22 be engaged with the hook 231 of the resisting arm 23.

It is worth noticing that the body 41 of the handle 40 includes a protrusion column 44 disposed on the side facing the accommodating space 100 (also refer to FIG. 3). Furthermore, when the end of the movable elastic arm 22 is engaged with the hook 231 of the resisting arm 23, the elastic piece 20 achieves self-locking. At the same time, the handle 40 is positioned (stopped) at a specific angle by the push of the movable elastic arm 22 through the protrusion column 44. Therefore, the handle 40 may not return to its original position.

Furthermore, when the end of the movable elastic arm 22 is disengaged from the hook 231, the elastic piece 20 releases its self-locking mechanism. Then, the handle 40 returns to its initial position along with the elastic piece 20. Accordingly, users may clearly determine whether the elastic piece 20 is in the open state based on the position of the handle 40 during connection.

As shown in FIG. 6, the cable 3 is inserted into the accommodation space 100 of the base 10 through the insertion port 12 to be electrically connected with the conducting lead 32. Additionally, when the cable 3 is inserted to the position of the resisting arm 23 and pushes against the resisting arm 23, the resisting arm 23 is moved by the push from the cable 3 to make the movable elastic arm 22 to be disengaged from the engagement of the hook 231.

It is worth noticing that the actuating part 42 of the handle 40 is adjacent to the pivot portion 14. Since the distance between the actuating part 42 and the pivot portion 14 is shorter compared to the distance between the movable elastic arm 22 and the pivot portion 14. Thus, the actuating part 42, when subjected to external force, requires only a shorter travel distance for a larger displacement of the movable elastic arm 22. Therefore, the volume of the base 10 may be kept from being excessively large, thereby achieving the purpose of reducing the overall size.

Figure 7:
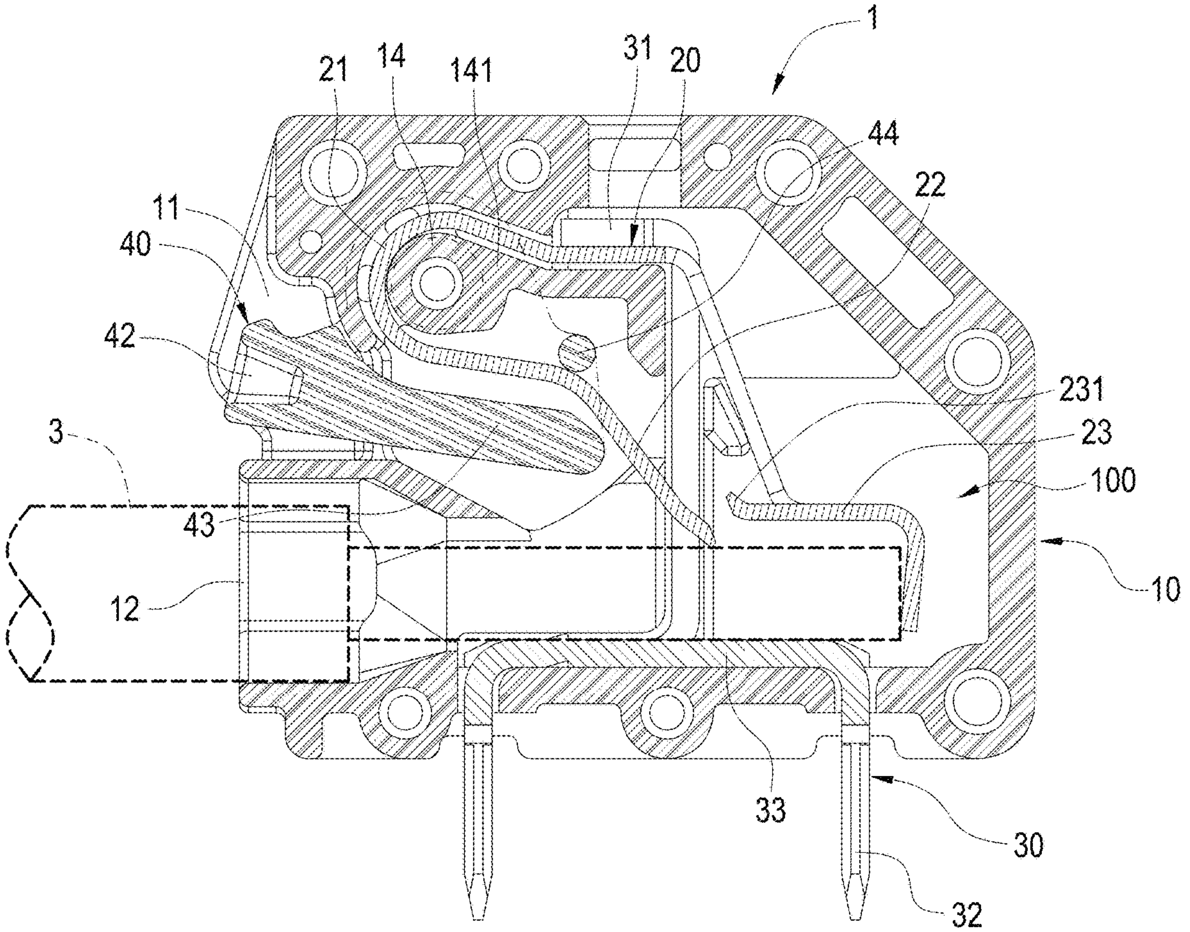
FIG. 7 illustrates a cross-sectional view of the cable positioned on the terminal block in this disclosure.

Please also refer to FIG. 7, which depicts a cross-sectional view of the cable positioned on the terminal block in this disclosure. Once the external force acting on the cable 3 is removed, the resisting arm 23 returns to its original position due to elastic force. Then, the movable elastic arm 22 presses against the cable 3 to secure the cable 3 within the base 10.

Figure 8:
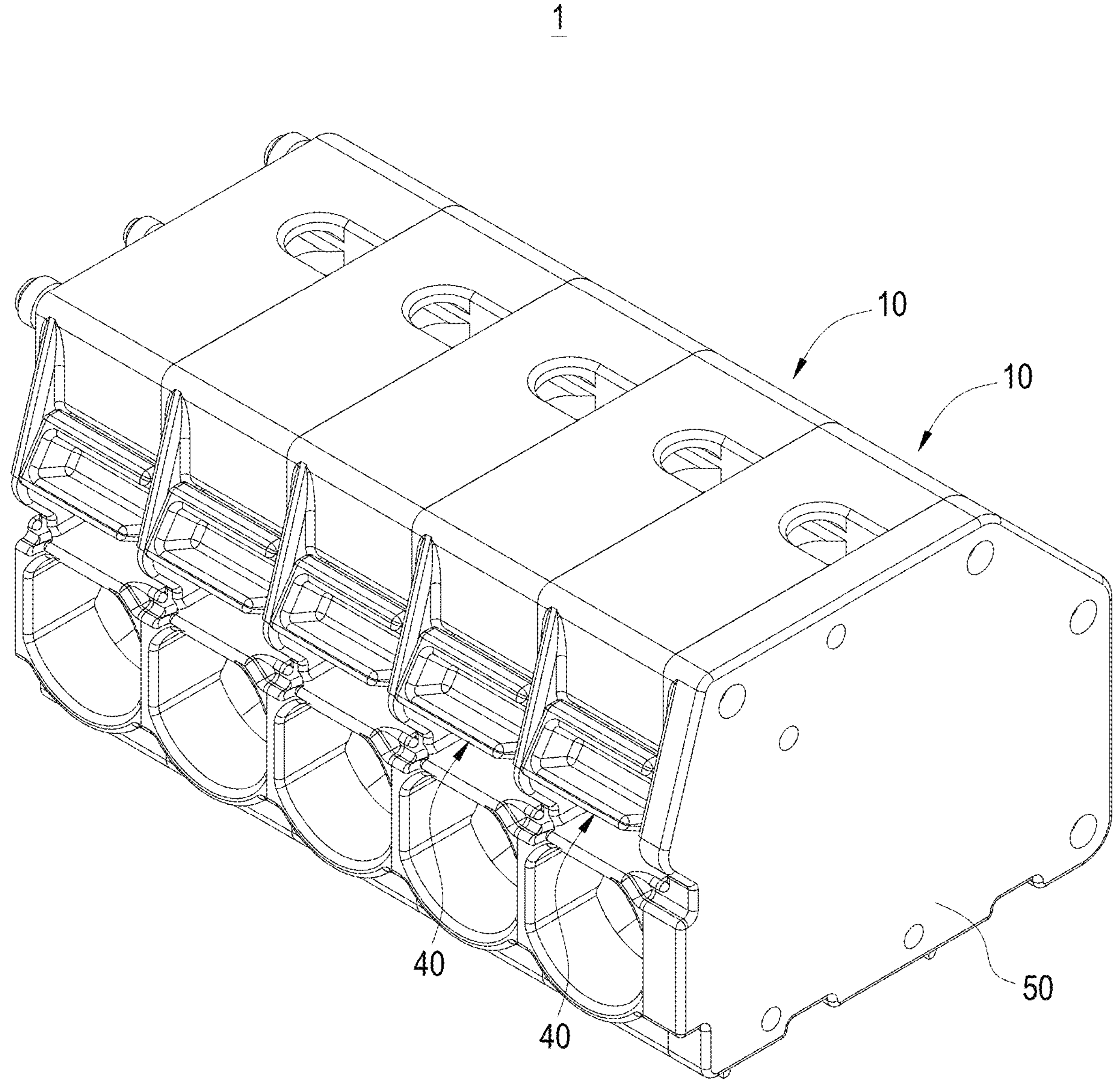
FIG. 8 illustrates another embodiment of the terminal block with a handle in this disclosure.

Please further refer to FIG. 8, which depicts another embodiment of the terminal block with a handle in this disclosure. In this embodiment, the terminal block 1 includes a plurality of base 10. Additionally, the bases 10 are arranged side by side, and the outermost base 10 is combined with a side cover 50. Additionally, the quantities of the elastic piece 20, the conductive terminal 30 (not shown in figures), and the handle 40 are correspondingly disposed in multiple and combined on the bases 10.

Figure 9:
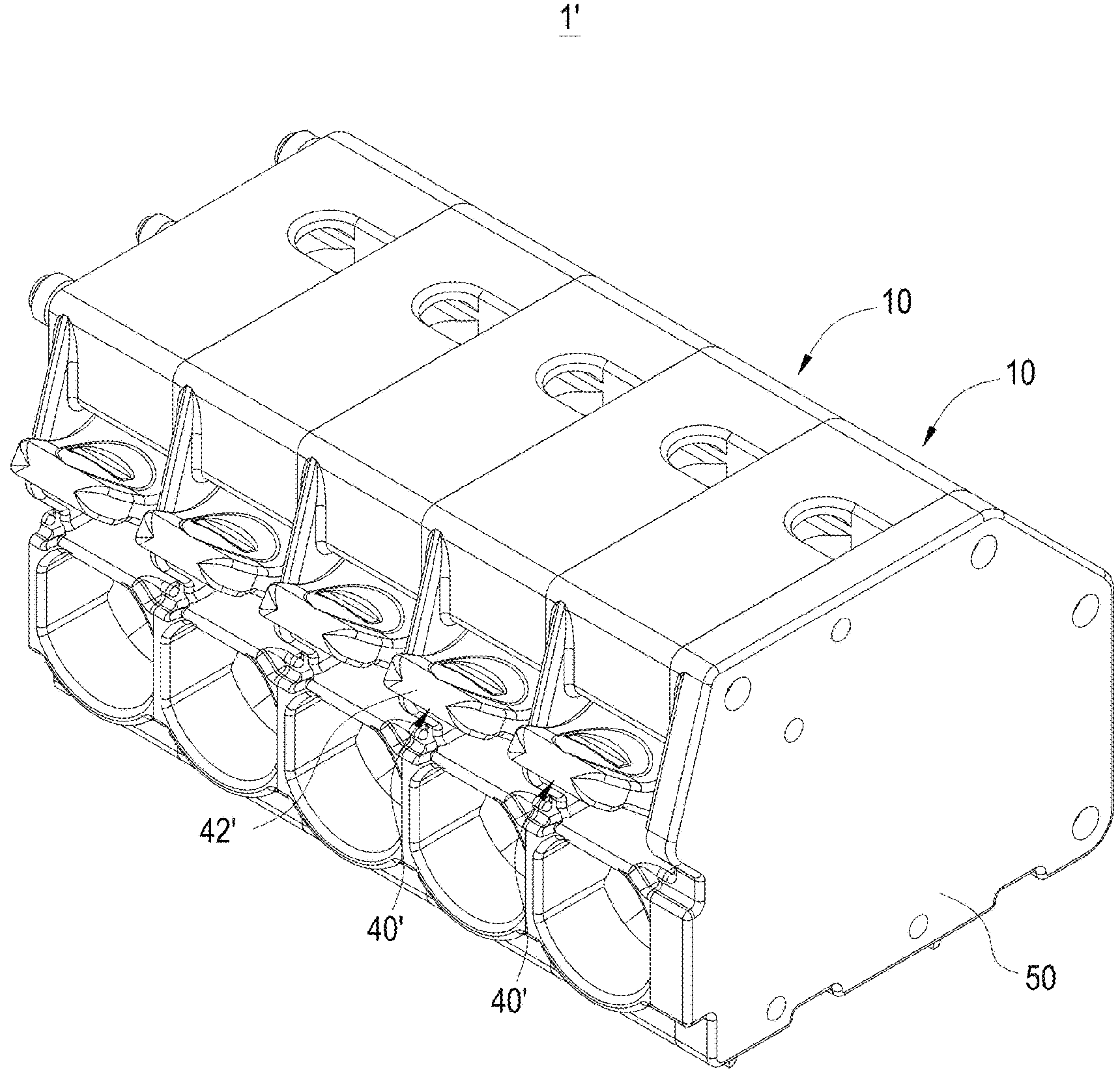
FIG. 9 illustrates another embodiment of the handle in this disclosure.

Please refer to FIG. 9, which illustrates another embodiment of the handle in this disclosure. In this embodiment, the terminal block 1' includes a plurality of base 10 arranged side by side, and the outermost base 10 is combined with a side cover 50. Furthermore, a plurality of handles 40' are correspondingly arranged and combined on the bases 10. The difference between this embodiment and the previous embodiment is the configuration of the actuating part 42' of each handle 40', which is designed as a pressure plate. Accordingly, when using the terminal block 1', users do not need additional tools. Users may directly press the actuating part 42' with their fingers to rotate the handle 40', thereby increasing the convenience of use.

Figure 10:
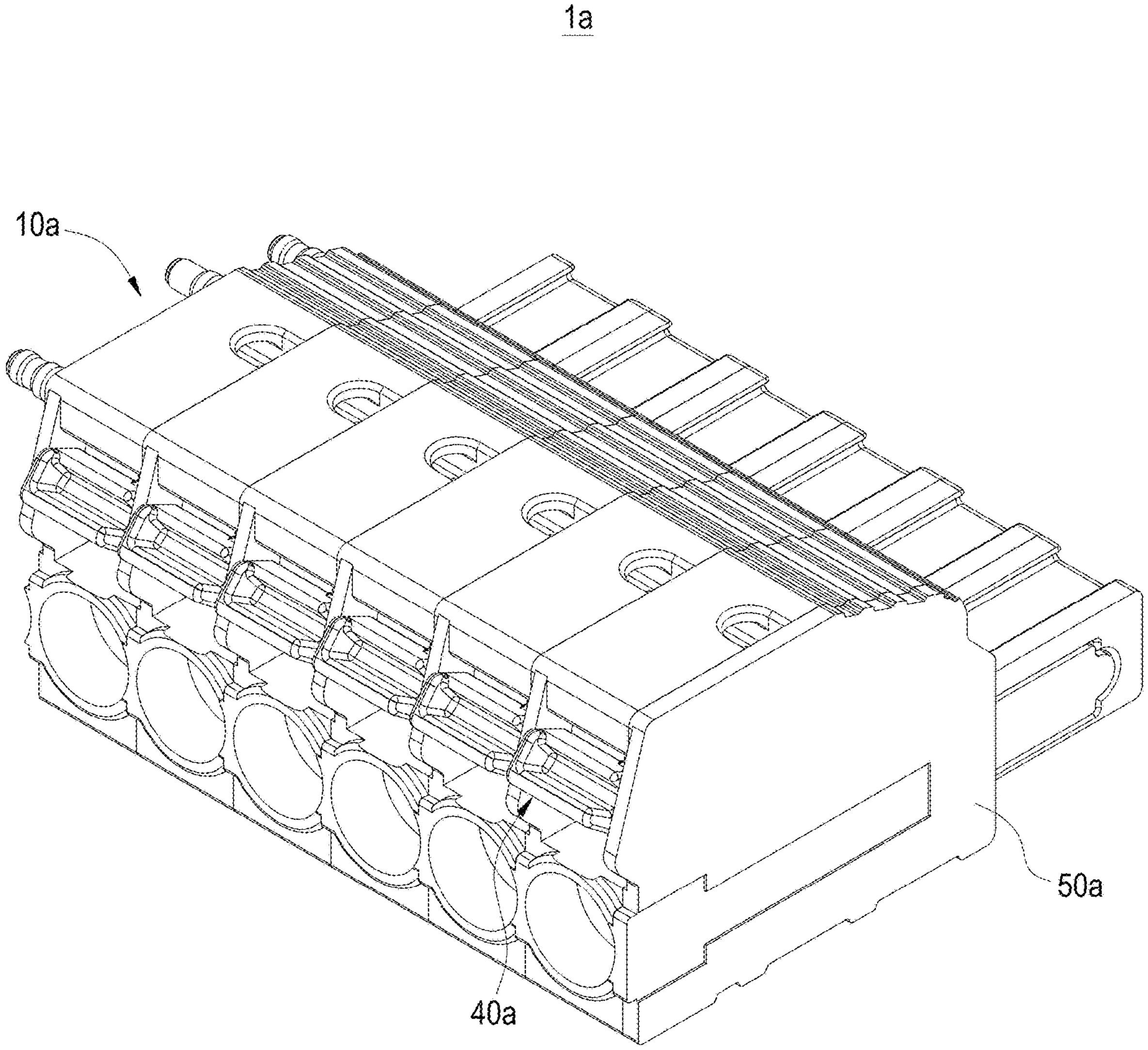
FIG. 10 illustrates a perspective schematic view of another embodiment of the terminal block with a handle in this disclosure.
Figure 11:
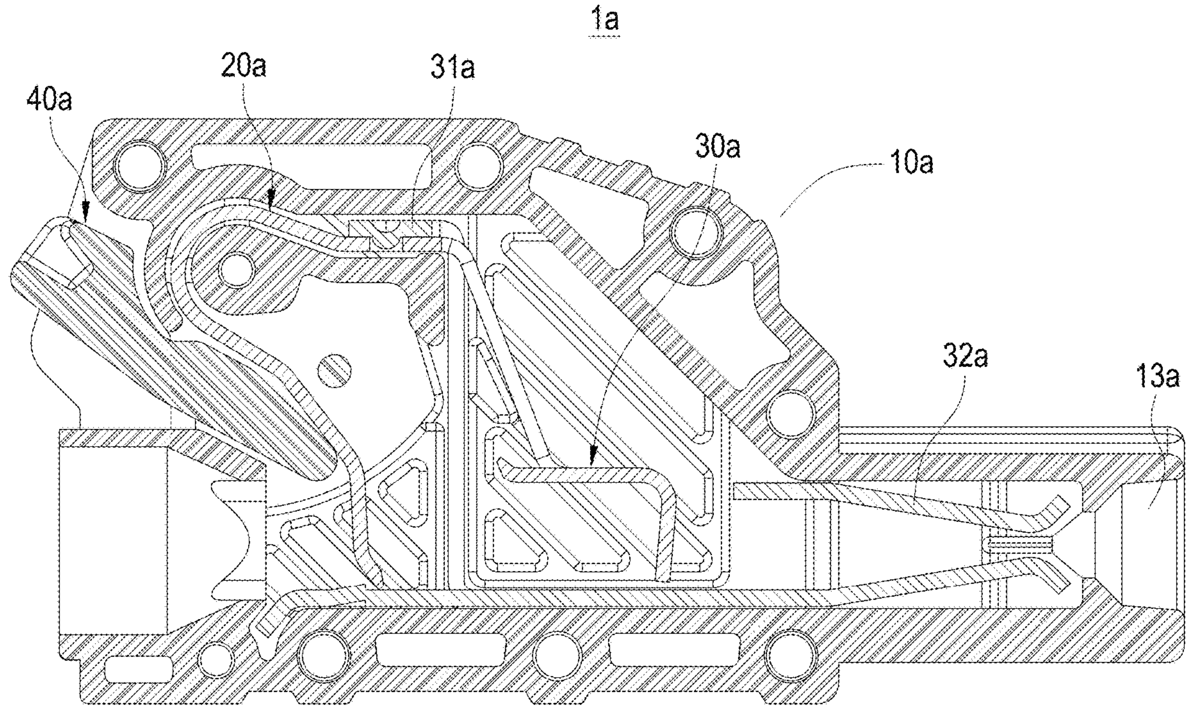
FIG. 11 illustrates a cross-sectional view of another embodiment of the terminal block with a handle in this disclosure.

Please refer to FIG. 10 and FIG. 11, which depict a perspective schematic view and a cross-sectional view of another embodiment of the terminal block with a handle in this disclosure. In this embodiment, the terminal block **1*a* includes a base 10*a*, an elastic piece 20*a*, a conductive terminal 30*a*, a handle 40*a* and a side cover 50*a*. The elastic piece 20*a* and the conductive terminal 30*a* are combined in the base 10*a*. The handle 40*a* is attached to one side of the base 10*a*. The side cover 50*a* is coupled to one side of the base 10*a*. The difference between this embodiment and the previous embodiment is the configuration of the conductive terminal 30*a***.

In this embodiment, the conductive terminal **30*a* includes a conductive section 31*a* and a pair of conducting leads 32 extending from the conductive section 31*a*. Furthermore, one end of the conductive section 31*a* contacts the elastic piece 20*a*. The conducting leads 32*a* are disposed corresponding to the penetration port 13*a* of the base 10. In this embodiment, the pair of conducting leads 32*a* is a pair of clamping legs. The pair of conducting leads 32*a* is utilized to be connected with a cable (not shown in figures) inserted through the penetration port 13*a* of the base 10*a***.

Figure 12:
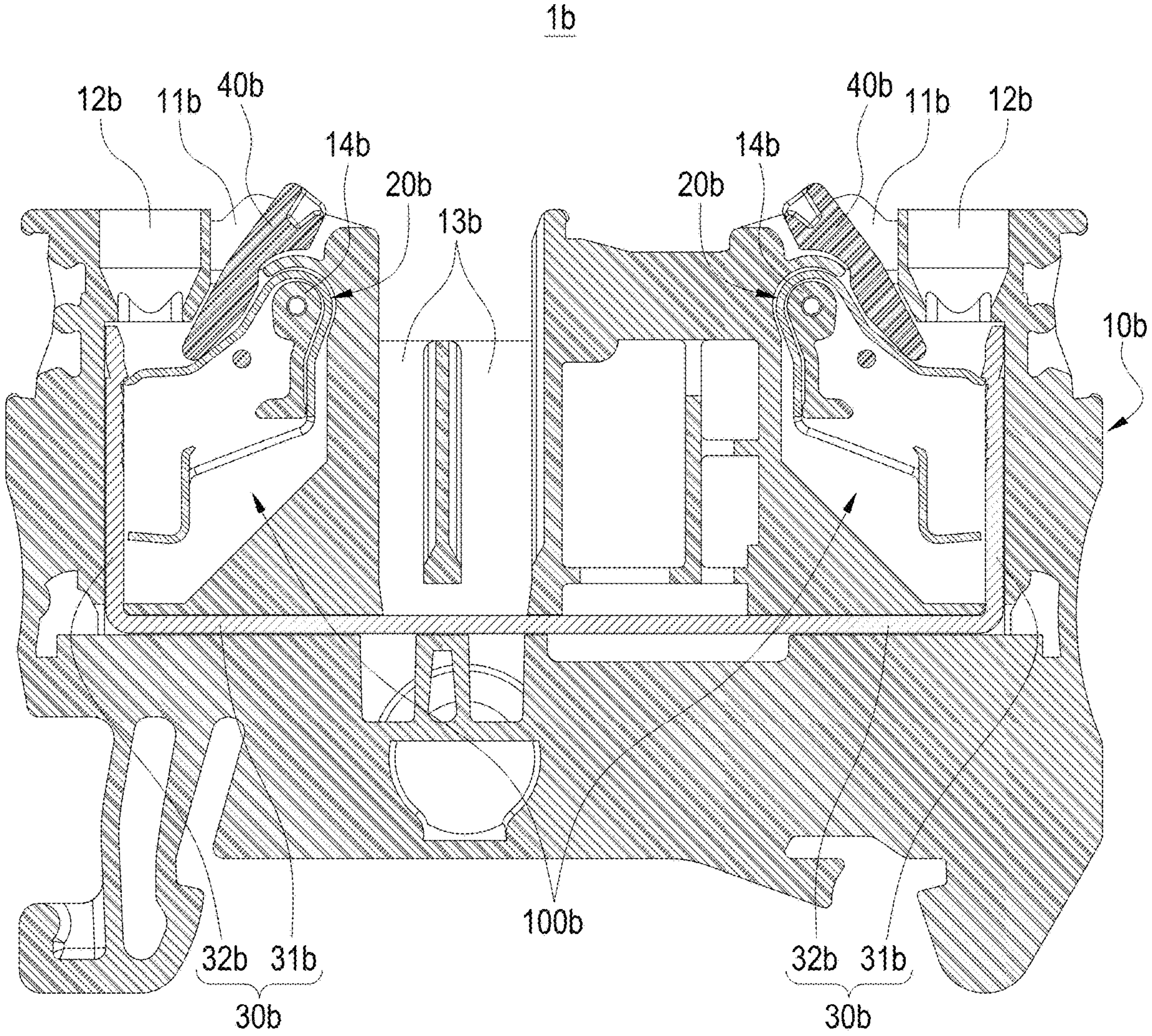
FIG. 12 illustrates a cross-sectional view of still another embodiment of the terminal block with a handle in this disclosure.

Please further refer to FIG. 12, which depicts a cross-sectional view of still another embodiment of the terminal block with a handle in this disclosure. In this embodiment, a terminal block **1*b* includes a base 10*b*, a pair of elastic pieces 20*b*, a pair of conductive terminals 30*b* and a pair of handles 40*b*. The pair of elastic pieces 20*b* and the pair of conductive terminals 30*b* are combined in the base 10*b*. The pair of handles 40*b* is positioned on one side of the base 10*b*, spaced apart from each other, with each handle 40*b* corresponding to pressing against one of the elastic pieces 20*b***.

Specifically, the base **10*b* has a pair of accommodating spaces 100*b* separately defined and a pair of installation openings 11*b*, a pair of insertion ports 12*b* and a pair of penetration ports 13*b* that communicate with the pair of accommodation spaces 100*b* respectively. Each installation opening 11*b*, each insertion port 12*b* and each penetration ports 13*b* are respectively disposed corresponding to each accommodating space 100*b*. The base 10*b* is respectively formed with a pivot portion 14*b* in each accommodation space 100*b*, and the pivot portion 14*b* is adjacent to the corresponding installation opening 11*b*. Each elastic piece 20*b* encircles the pivot portion 14*b*. Additionally, each conductive terminal 30 includes a conductive section 31*b* and a conducting lead 32*b* extending from the conductive section 31*b*. One end of the conductive section 31*b* contacts the elastic piece 20*b*. The conducting lead 32*b* is disposed corresponding to the penetration port 13*b***.

It should be noted that the ends of the pair of conductive terminals **30*b* are connected and positioned on one side of the pair of penetration ports 13*b*. Consequently, the pair of insertion ports 12***b* may be inserted by a pair of cables (not shown in figures). The pair of cables may be connected to external wires inserted through the pair of penetration ports 13*b* via the pair of elastic pieces 20*b* and conductive terminals 30*b*.

While this disclosure has been described by means of specific embodiments, numerous modifications and variations could be made thereto by those skilled in the art without departing from the scope and spirit of this disclosure set forth in the claims.

What is claimed is:

1. A terminal block for inserting a cable, the terminal block comprising:

a base, comprising an accommodation space, an installation opening, an insertion port, and a penetration port all communicating with the accommodation space, and comprising a pivot portion disposed in the accommodation space and adjacent to the installation opening;

an elastic piece, comprising a bending section, a movable elastic arm, and a resisting arm, wherein the movable elastic arm and the resisting arm extend respectively from two sides of the bending section, and the bending section surrounds the pivot portion;

a conductive terminal, comprising a conductive section and at least one conducting lead extending from the conductive section, wherein one end of the conductive section contacts the resisting arm, and the at least one conducting lead is disposed corresponding to the penetration port; and a handle, combined in the installation opening, pivotally connected to the pivot portion, and exposed from one side of the insertion port;

wherein the handle rotates and pushes the movable elastic arm under an external force, the movable elastic arm is being pushed and abuts against the resisting arm, and the cable is inserted into the accommodation space through the insertion port to be electrically connected with the at least one conducting lead.

2. The terminal block according to claim 1, wherein the insertion port and the installation opening are defined on a same side of the base and located on a side perpendicular to the penetration port.

3. The terminal block according to claim 1, wherein the pivot portion comprises a cylinder column and a pivot shaft coaxially arranged with each other, and the pivot shaft protrudes from the cylinder column.

4. The terminal block according to claim 3, wherein the bending section comprises a pivot space, and the bending section encircles the cylinder column by the pivot space.

5. The terminal block according to claim 3, wherein the base comprises a plurality of positioning parts disposed in the accommodating space, and the resisting arm abuts against one side of the positioning parts and is arranged in the accommodating space.

6. The terminal block according to claim 5, wherein the positioning parts comprise a positioning plate and a positioning block; one side of the positioning plate is connected to the cylinder column; and the positioning block is spacedly disposed on one side of the positioning plate.

7. The terminal block according to claim 1, wherein the resisting arm comprises a hook disposed on a side thereof facing the movable elastic arm, and the movable elastic arm is pressed to be engaged with the hook.

8. The terminal block according to claim 1, wherein the conductive terminal further comprises a supporting plate positioned between the conductive section and the at least one conducting lead, an amount of the at least one conducting lead is two, and a pair of conducting leads are arranged on two sides of the supporting plate opposite to each other.

9. The terminal block according to claim 8, wherein the pair of conducting leads is a pair of insertion pins.

10. The terminal block according to claim 8, wherein the pair of conducting leads is a pair of clamping legs.

11. The terminal block according to claim 1, wherein the conductive section comprises a U-shaped frame.

12. The terminal block according to claim 1, wherein the handle comprises a body, an actuating part and a pressing part, the actuating part is exposed from the installation opening, the pressing part is positioned adjacent to the movable elastic arm, and the actuating part and the pressing part are located on two sides of the body opposite to each other.

13. The terminal block according to claim 12, wherein an axis hole is defined on the body, and the handle is combined with the base through the pivot portion (14) passing through the axis hole.

14. The terminal block according to claim 12, wherein the body comprises a protrusion column located on a side thereof facing the accommodating space, and the handle is positioned at a specific angle through the protrusion column being pushed by the movable elastic arm.

15. The terminal block according to claim 12, wherein the actuating part comprises an insertion hole.

16. The terminal block according to claim 12, wherein the actuating part comprises a pressing plate.

17. The terminal block according to claim 1, further comprising a side cover combined on one side of the base and enclosing the accommodation space.

18. The terminal block according to claim 1, wherein an amount of the base is multiple, a plurality of bases is arranged side by side, the base located outermost is combined with a side cover, and an amount of the elastic piece, an amount of the conductive terminal and an amount of the handle are multiple correspondingly and combined on the bases.

19. The terminal block according to claim 1, wherein the base comprises a pair of the accommodating spaces separately defined and a pair of the installation openings, a pair of the insertion ports and a pair of the penetration ports all communicating with the pair of the accommodation spaces respectively; each installation opening, each insertion port and each penetration port are disposed corresponding to each accommodating space, the base comprises the pivot portion disposed in each accommodation space, and the pivot portion is positioned adjacent to the installation opening correspondingly.

20. The terminal block according to claim 19, wherein an amount of the elastic plate, an amount of the conductive terminal, and an amount of the handle are two respectively; each elastic plate encircles the pivot part; and ends of a pair of conductive terminals are connected and located on one side of a pair of penetration ports.

* * * * *